(12) United States Patent  (10) Patent No.: US 7,560,187 B2
Inagaki                    (45) Date of Patent:     Jul. 14, 2009

(54) FUEL CELL STACK

(75) Inventor: Toshiyuki Inagaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 232 days.

(21) Appl. No.: 10/578,928

(22) PCT Filed: Nov. 8, 2004

(86) PCT No.: PCT/JP2004/016911

§ 371 (c)(1), (2), (4) Date: May 9, 2006

(87) PCT Pub. No.: WO2005/053080

PCT Pub. Date: Jun. 9, 2005

(65) Prior Publication Data

US 2007/0042250 A1    Feb. 22, 2007

(30) Foreign Application Priority Data

Nov. 25, 2003  (JP) ............................. 2003-393802
May 28, 2004   (JP) ............................. 2004-158764

(51) Int. Cl.
    *H01M 8/02* (2006.01)
    *H01M 8/24* (2006.01)
(52) U.S. Cl. .......................................... 429/37; 429/38
(58) Field of Classification Search ................ 429/37, 429/38, 39
    See application file for complete search history.

(56) References Cited

U.S. PATENT DOCUMENTS

| | | |
|---|---|---|
| 4,431,714 A | 2/1984 | Myerhoff |
| 4,689,280 A * | 8/1987 | Gionfriddo ............ 429/39 X |
| 5,547,777 A | 8/1996 | Richards |
| 5,686,200 A | 11/1997 | Barton et al. |
| 6,210,823 B1 | 4/2001 | Hatoh et al. |
| 6,613,470 B1 | 9/2003 | Sugita et al. |
| 6,645,659 B2 | 11/2003 | Bisaka et al. |
| 6,855,448 B2 | 2/2005 | Kikuchi et al. |

(Continued)

FOREIGN PATENT DOCUMENTS

DE    100 41 532 A1   3/2001

(Continued)

OTHER PUBLICATIONS

Feb. 29, 2008 Foreign Office Action.

*Primary Examiner*—Stephen J. Kalafut
(74) *Attorney, Agent, or Firm*—Oliff & Berridge, PLC

(57) ABSTRACT

A fuel cell stack includes a plurality of multi-cell modules stacked and a restraining member. Each multi-cell module includes a plurality of fuel cells including opposite end fuel cells at opposite ends of the plurality of fuel cells layered. The restraining member restrains the multi-cell module in a direction perpendicular to the fuel cell stacking direction at the opposite end fuel cells of each multi-cell module. Each of the opposite end fuel cells has an extended portion formed by extending the opposite end fuel cell outwardly in a direction perpendicular to the fuel cell stacking direction, and each multi-cell module is restrained by the restraining member at the extended portion. A hole is formed in the extended portion and a restraining shaft defining the restraining member extends through the hole. A deformation preventing member may be disposed between the extended portions.

14 Claims, 6 Drawing Sheets

U.S. PATENT DOCUMENTS

| | | |
|---|---|---|
| 2004/0157106 A1 | 8/2004 | Suguira et al. |
| 2005/0277012 A1 | 12/2005 | Inagaki |

FOREIGN PATENT DOCUMENTS

| | | |
|---|---|---|
| DE | 102 13 558 A1 | 11/2002 |
| EP | 1 445 815 A2 | 8/2004 |
| JP | A 61-248368 | 11/1968 |
| JP | A 58-115772 | 7/1983 |
| JP | A 61-39373 | 2/1986 |
| JP | A 62-31942 | 2/1987 |
| JP | A 62-165874 | 7/1987 |
| JP | A 8-22837 | 1/1996 |
| JP | A 08-045535 | 2/1996 |
| JP | A 09-092324 | 4/1997 |
| JP | A 09-115531 | 5/1997 |
| JP | A 11-007975 | 1/1999 |
| JP | A 2001-110439 | 4/2001 |
| JP | A 2002-124291 | 4/2002 |
| JP | A 2002-302785 | 10/2002 |
| JP | A 2003-92131 | 3/2003 |
| JP | A 2003-115303 | 4/2003 |
| JP | A 2003-157864 | 5/2003 |
| WO | WO 2005/008826 A1 | 1/2005 |

\* cited by examiner

FUEL CELL STACK

This application is a U.S. National Stage Application of PCT/JP2004/016911, the entire disclosure of which is incorporated by reference in the entirety and which claims priority from JP 2003-39380, filed on Nov. 25, 2003, and JP2004-158764, filed on May 28, 2004.

FIELD OF INVENTION

The present invention relates to a fuel cell. More particularly, the present invention relates to a fuel cell stack structure.

BACKGROUND OF THE INVENTION

As illustrated in Japanese Patent Publication No. 2002-124291, and as illustrated in FIGS. 16 and 17, a fuel cell, for example, a Polymer Electrolyte Fuel Cell (PEFC) apparatus 10 includes a layering structure of a Membrane-Electrode Assembly (MEA) and a separator 18. The layering direction may be in any direction.

The MEA includes an electrolyte membrane 11 made from an ion exchange membrane and a pair of electrodes which includes an anode 14 disposed on one side of the electrolyte membrane and a cathode 17 disposed on the other side of the electrolyte membrane. A diffusion layer 13 may be disposed between the anode and the separator 18, and a diffusion layer 16 may be disposed between the cathode and the separator 18.

A first separator 18 disposed on one side of the MEA has a fuel gas passage 27 formed therein for supplying fuel gas (hydrogen) to the anode 14, and a second separator 18 disposed on the other side of the MEA has an oxidant gas passage 28 for supplying oxidant gas (oxygen, usually, air) to the cathode 17. The first and second separators 18 have a coolant passage 26 on opposite sides of the fuel gas passage 27 and the oxidant gas passage 28. In order to seal the fluid passages 26, 27 and 28 to each other, a rubber gasket 32 is disposed between adjacent fuel cells and an adhesive seal 33 is provided between the separators 18 disposed on opposite sides of the MEA of each fuel cell.

At least one (three at most) fuel cell 19 constructs a module. A number of modules are piled, and electrical terminals 20, electrical insulators 21, and end plates 22 are disposed at opposite end of the pile of modules to construct a stack of fuel cells (a fuel cell stack) 23. After tightening the stack of fuel cells between the end plates 22 in the fuel cell stacking direction, the end plates 22 are coupled to a fastening member 24 (for example, a tension plate) extending in the fuel cell stacking direction outside the pile of modules by bolts or nuts 25.

In the PEFC, hydrogen changes to positively charged hydrogen ions (i.e., protons) and electrons at the anode 14. The hydrogen ions move through the electrolyte membrane 11 to the cathode 17 where the hydrogen ions react with oxygen supplied and electrons (which are generated at an anode of an adjacent MEA and move to the cathode 17 of the instant MEA through a separator, or which are generated at an anode of a fuel cell located at one end of the fuel cell stack and move to the cathode 17 of the instant fuel cell located the other end of the fuel cell stack through an external electrical circuit) to form water as follows:

At the anode: 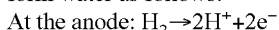
At the cathode: 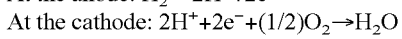

In the conventional fuel cell stack, the modules are held as follows:

A spring 34, a tilting portion 35 and an adjusting screw 36 are provided at one end of the stack of fuel cells 23. Each module of the stack 23 is held in the fuel cell stacking direction by a constant force generated by the spring 34 and is held in a direction perpendicular to the fuel cell stacking direction by a frictional force defined as a spring force multiplied by a coefficient of friction.

In order to hold the modules more securely, it will be conceived to fill a space between the side surface of the pile of modules and the tension plate with an external restraining member to restrain the pile of modules from outside.

However, the following problems with the above fuel cell stack exist:

i) When an impact force with an acceleration ($\alpha$) of several to twenty G (G: acceleration of gravity) acts on the stack of fuel cells of mass M in the direction perpendicular to the fuel cell stacking direction, a shear force is generated near the end of the stack of fuel cells. When the shear force exceeds the spring force multiplied by a coefficient of friction, slippage occurs between the modules near the end of the stack of fuel cells accompanied by disassembly of the stack of fuel cells.

ii) In the case where the modules are held from the outside by the external restraining member, when the MEA and the diffusion layers of the fuel cell cause a creep receiving the spring force and the fuel cell near the end of the fuel cell stack moves in the fuel cell stacking direction relative to the external restraining member, the fuel cell interferes with the external restraining member, which is also damaged. If the spring force is made small in order to decrease a creep amount, it is difficult to ensure a necessary contact pressure between the fuel cells.

A first problem solved by the present invention is the problem of disassembly of the stack near the end of the stack which occurs when an impact force with an acceleration in a direction perpendicular to the fuel cell stacking direction acts on the stack.

A second problem solved by the present invention is the problem of damage to the fuel cell which may occur in the stack having an external restraining member when the fuel cell near the end of the stack moves relative to the external restraining member due to creep of the MEA and the diffusion layer.

SUMMARY OF THE INVENTION

A first object of the present invention is to provide a fuel cell stack which can prevent a stack of fuel cells from being disassembled due to a slippage between modules near an end of the stack even when an impact with an acceleration in a direction perpendicular to a fuel cell stacking direction acts on the stack.

A second object of the present invention is to provide a fuel cell stack which can prevent a stack of fuel cells from being disassembled even when an impact force acts on the stack, and when an external restraining member is provided, does not cause an interference of the fuel cell with the external restraining member near an end of the stack.

A fuel cell stack according to embodiments of the present invention that achieves the above and other objects is described as follows:

(1) The fuel cell stack of embodiments of the present invention includes a plurality of multi-cell modules stacked in series and a restraining member.

Each of the plurality of multi-cell modules includes a plurality of fuel cells layered in a fuel cell stacking direction and includes opposite end fuel cells at opposite ends of the plurality of layered fuel cells.

The restraining member restrains each of the plurality of multi-cell modules at the opposite end fuel cells of each of the plurality of multi-cell modules.

(2) The restraining member restrains each of the plurality of fuel cells in a direction perpendicular to the fuel cell stacking direction.

(3) The fuel cell may further include a connecting member for connecting adjacent multi-cell modules of the plurality of multi-cell modules to each other at the opposite end fuel cells of the adjacent multi-cell modules.

(4) Each of the opposite end fuel cells of each of the plurality of multi-cell modules is a dummy fuel cell generating no electric power.

(5) Each of the opposite end fuel cells of each of the plurality of multi-cell modules has an extended portion formed by extending each of the opposite end fuel cells of each of the plurality of multi-cell modules outwardly in a direction perpendicular to the fuel cell stacking direction of each of the plurality of multi-cell modules. Each of the plurality of multi-cell modules is restrained by the restraining member in the direction perpendicular to a fuel cell stacking direction of each of the plurality of multi-cell modules at the extended portion.

(6) The extended portion includes a hole formed therein and the restraining member is a restraining shaft extending through the hole formed in the extended portion.

(7) The restraining shaft is a fuel cell stack tightening shaft.

(8) The connecting member is a member different from the restraining member.

(9) The connecting member may be a clip.

(10) The connecting member may be a bolt or a rivet.

(11) The connecting member may be an ear portion formed in an extended portion of an end fuel cell of a first multi-cell module. The ear portion is bent so as to hold an extended portion of an end fuel cell of a second, adjacent multi-cell module.

(12) The extended portion and the restraining shaft may be electrically insulated from each other by an electric insulator.

(13) The electric insulator may be a bushing fixed to the hole formed in the extended portion of each of the opposite end fuel cells.

(14) The bushing has a flange for preventing the bushing from being disengaged from the extended portion.

(15) The electric insulator may be a cylindrical member supported by the restraining shaft.

(16) The fuel cell stack may further include a deformation preventing member, disposed between extended portions of the opposite end fuel cells of each of the plurality of multi-cell modules, for preventing the extended portions of the opposite end fuel cells of each of the plurality of multi-cell modules from being deformed inboardly in the fuel cell stacking direction.

(17) The deformation preventing member includes an elastic member.

With respect to a fuel cell stack according to the present invention, the following technical advantages are obtained:

According to the fuel cell stack in items (1) to (3) above, since the fuel cell stack is divided into a plurality of multi-cell modules and each multi-cell module is restrained in the direction perpendicular to the fuel cell stacking direction at the opposite end fuel cells of each multi-cell module, a transverse inertial force of each multi-cell module and a shear force imposed on each multi-cell module is 1/n of those of the conventional fuel cell stack, where n is a number of division of the stack into the plurality of multi-cell modules. More particularly, in the conventional stack, a transverse force of $(M\alpha)$ acts on the entire portion of the stack, where M is a mass of the stack and $\alpha$ is an acceleration of an impact force in the direction perpendicular to the fuel cell stacking direction, and therefore, a shear force S of $(M\alpha)/2$ acts on the end fuel cell of the stack. In contrast, in the present invention, a transverse force acts on each multi-cell module is $(M\alpha)/n$ and a shear force of each multi-cell module is S/n. As a result, each multi-cell module can endure a high G (acceleration of gravity).

Further, a spring force imposed on each multi-cell module in the fuel cell stacking direction does not need to be as large as the force required in the conventional fuel cell stack that generates a frictional force capable of enduring the shear force of $(M\alpha)/2$. The spring force imposed on each multi-cell module in the fuel cell stacking direction of the present invention can be reduced to a force which keeps the electric resistance in the stack small. As a result, a creep amount of the stack in the fuel cell stacking direction is also reduced.

Further, since the fuel cell stack is divided into a plurality of multi-cell modules, a displacement of the fuel cell stack in the fuel cell stacking direction due to the creep of the MEA and the diffusion layer does not concentrate to the end fuel cell of the stack unlike the conventional fuel cell stack. The displacement of a fuel cell is distributed to all of the multi-cell modules. As a result, displacement in the fuel cell stacking direction of each multi-cell module is reduced to a great extent compared with the displacement of the end fuel cell of the conventional stack. In addition, since the creep amount itself is small due to a decrease in the spring force, the displacement of a fuel cell of each multi-cell module is small.

Further, since a structure where the multi-cell modules are restrained at an entire side surface by an external restraining member is not adopted, the fuel cell of the multi-cell module will not interfere with the external restraining member to be damaged even if the fuel cell of the multi-cell module moves in the fuel cell stacking direction due to a thermal expansion.

Further, since the above structure where the multi-cell modules are restrained at an entire side surface by an external restraining member is not adopted, a space for the external restraining member and a module frame does not need to be provided, and the fuel cell stack can, therefore, be compact and light. Due to the lightened stack, a countermeasure for an impact force with a high G is easily provided. Due to removal of the module frame, coupling a cell voltage monitor to the fuel cell will be easy.

According to the fuel cell stack in item (4) above, since the end fuel cell of the multi-cell module is a dummy fuel cell, the end fuel cell can be designed to satisfy a condition for a structural member independently of a power generating condition. Therefore, the end fuel cell can endure a transverse impact with a sufficient strength and reliability.

According to the fuel cell stack in item (5) above, since the end fuel cell of the multi-cell module is extended outwardly and the multi-cell modules are restrained in a direction perpendicular to the fuel cell stacking direction at the extended portion, it is not necessary to make a significant design change to the fuel cell structure of the multi-cell module.

According to the fuel cell stack in item (6) above, since the extended portion has a hole and a restraining shaft extends through the hole, the multi-cell module can be supported in the direction perpendicular to the fuel cell stacking direction with sufficient strength and reliability.

According to the fuel cell stack in item (7) above, since the restraining shaft is commonly used as a fastening shaft of the fuel cell stack, a shaft different from the fastening shaft does not need to be provided for the restraining shaft, which simplifies the structure of the fuel cell stack and reduces the number of parts of the fuel cell stack.

According to the fuel cell stack in item (8) above, since the opposing end fuel cells of the adjacent multi-cell modules are connected to each other by the connecting member which is a member different from the restraining shaft, the opposing end fuel cells have increased rigidity. When a rubber gasket is disposed and tightened between the opposing fuel cells, the opposing end fuel cells can impose a necessary sealing force on the rubber gasket without being deformed in a direction away from the rubber gasket. Since the opposing end fuel cells are increased by means of the connecting member, the opposing end fuel cells do not need to be increased in thickness. As a result, the opposing end fuel cells can be decreased in thickness and can be lightened. Due to the lightened end fuel cells, a countermeasure for an impact force with a high G is easily provided.

Items (9), (10) and (11) above disclose various examples of the connecting member.

According to the fuel cell stack in items (12), (13), (14) and (15) above, since the end fuel cell and the restraining shaft extending through the hole formed in the end fuel cell are electrically insulated from each other by an electric insulator, a carbon separator or a metal separator can be used for the end fuel cell. In a case where the extended portion of the end fuel cell is made from a synthetic resin, the electric insulator does not need to be provided between the end fuel cell and the restraining shaft.

According to the fuel cell stack in items (16) and (17) above, since a deformation preventing member is disposed between the extended portions of the opposite end fuel cells of the multi-cell module, the extended portions of the opposite end fuel cells of the multi-cell module are prevented from being deformed inboardly in the fuel cell stacking direction. As a result, the multi-cell module can cause a smooth displacement.

BRIEF DESCRIPTION OF THE DRAWINGS

The fuel cell stack of the various embodiments of the present invention will now be described with reference to the accompanying drawings, in which.

DETAILED DESCRIPTION OF PREFERRED EMBODIMENTS

A fuel cell stack according to the present invention will be explained with reference to FIGS. 1-15.

Figure 3:
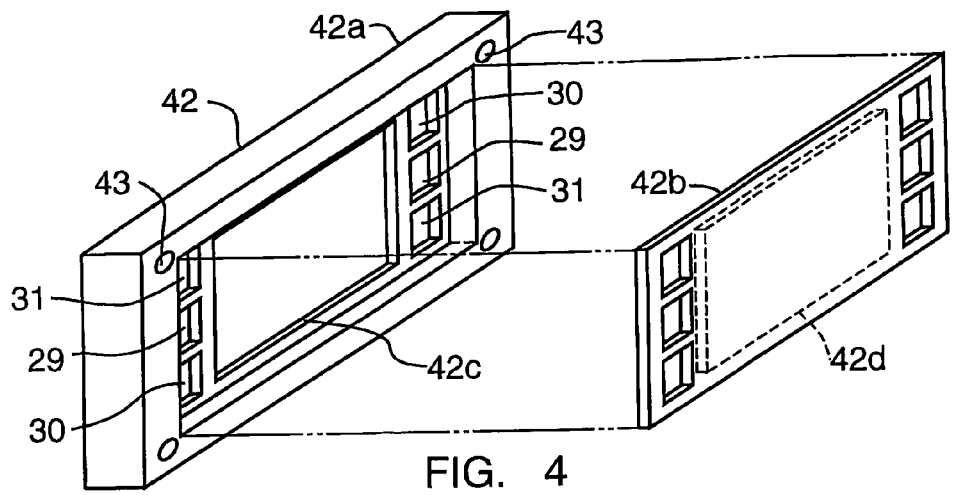
FIG. 3 is a developed, perspective view of an end fuel cell of the multi-cell module of the fuel cell stack according to the first embodiment of the present invention.
Figure 4:
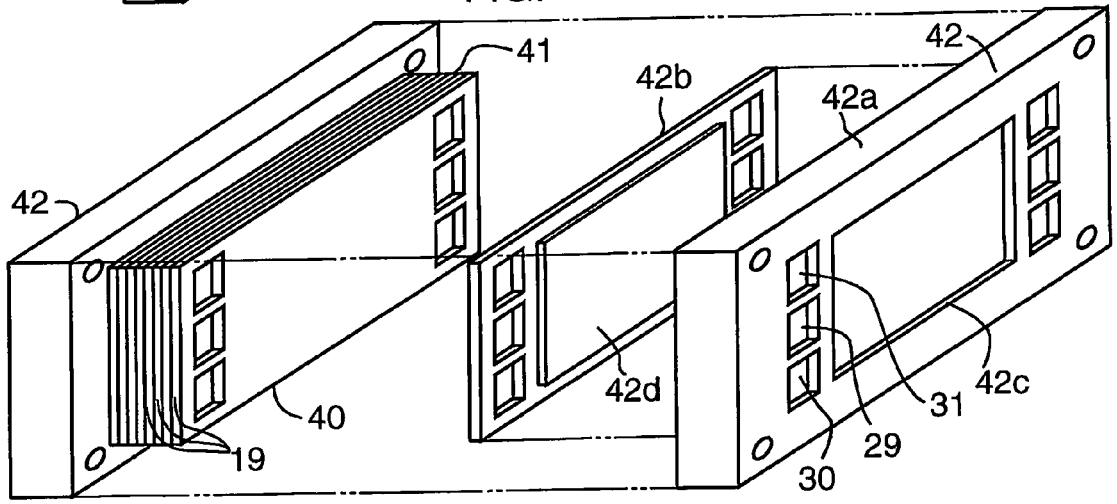
FIG. 4 is a developed, perspective view of the multi-cell module of the fuel cell stack according to the first embodiment of the present invention.
Figure 5:
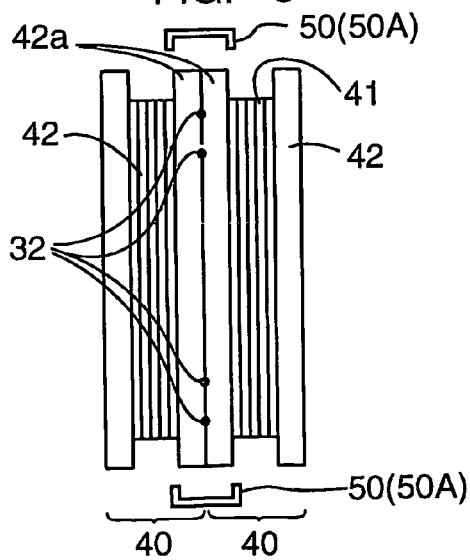
FIG. 5 is a side elevational view of adjacent multi-cell modules, connected by a connecting member of a clip, of a fuel cell stack according to a second embodiment of the present invention.
Figure 6:
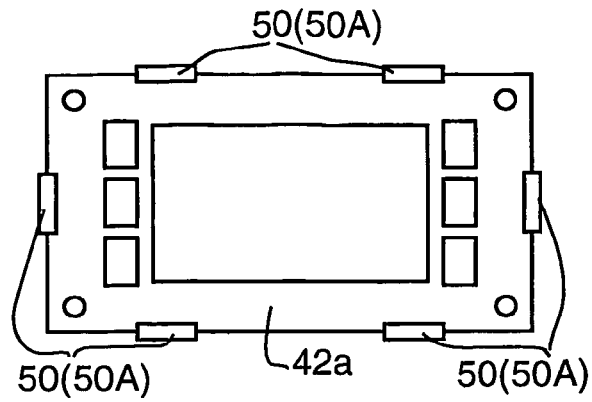
FIG. 6 is a front elevational view of the multi-cell modules of FIG. 5.
Figure 7:
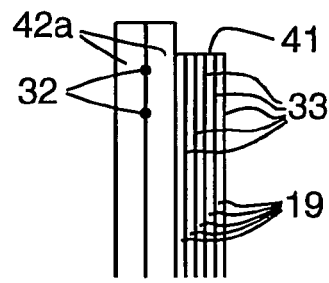
FIG. 7 is a side elevational view of a portion of the multi-cell modules of FIG. 5, illustrating a relationship between a rubber gasket seal and an adhesive seal.
Figure 8:
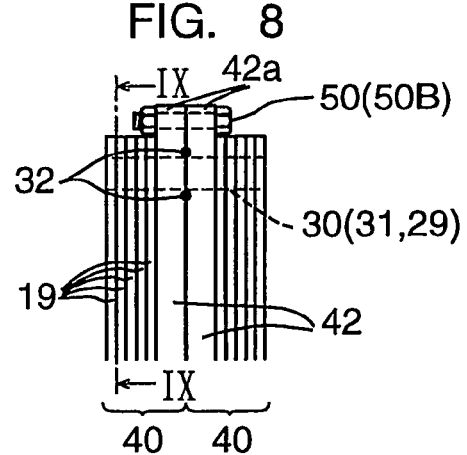
FIG. 8 is a side elevational view of adjacent multi-cell modules, connected by a connecting member of a bolt or a rivet, of a fuel cell stack according to a third embodiment of the present invention.
Figure 9:
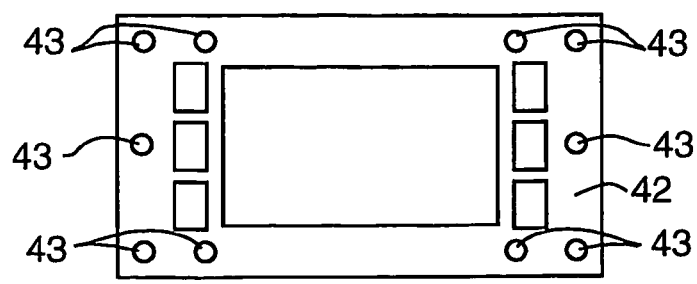
FIG. 9 is a cross-sectional view taken along line IX-IX of FIG. 8.
Figure 10:
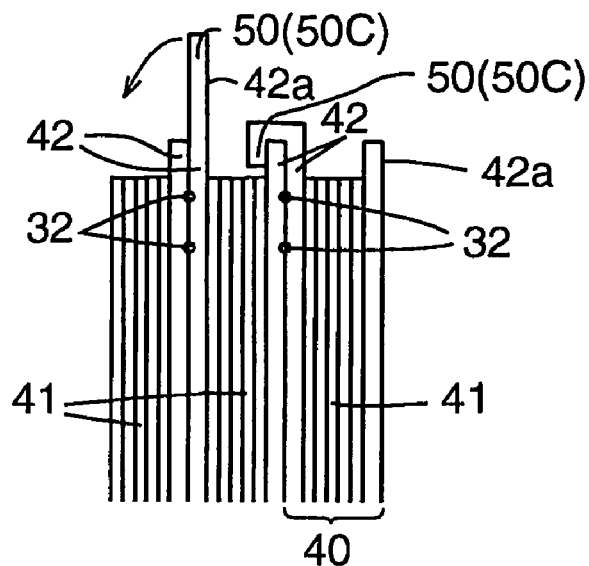
FIG. 10 is a side elevational view of a plurality of multi-cell modules, connected by a connecting member of a bent ear, of a fuel cell stack according to a fourth embodiment of the present invention.
Figure 11:
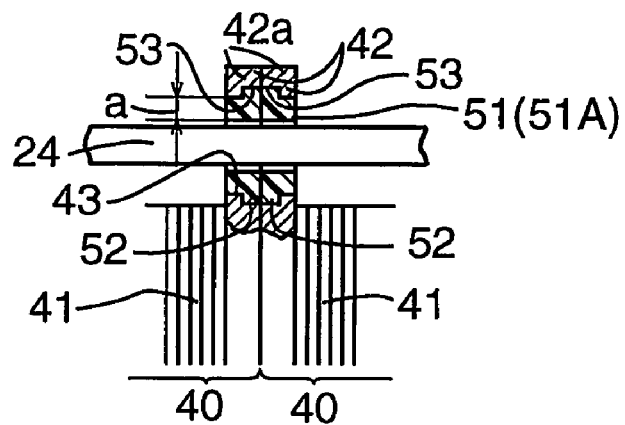
FIG. 11 is a side elevational view partially shown in cross section, of portions of adjacent multi-cell modules, connected by a connecting member of a bushing, of a fuel cell stack according to a fifth embodiment of the present invention.
Figure 12:
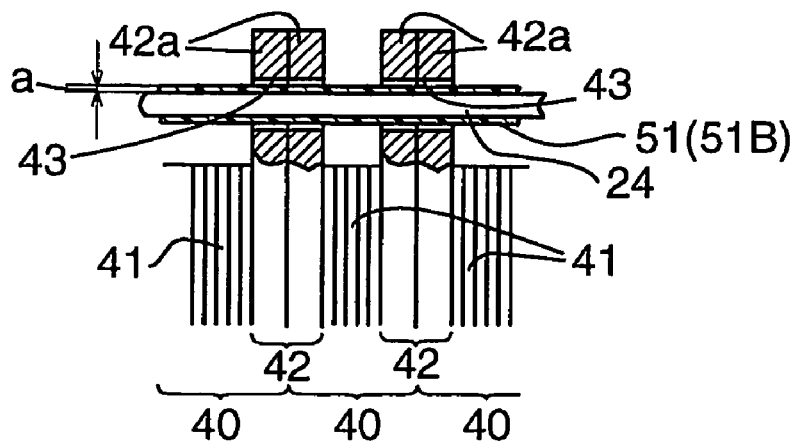
FIG. 12 is a side elevational view partially shown in cross section, of portions of adjacent multi-cell modules, including an electrical insulator of a bushing, of a fuel cell stack according to a sixth embodiment of the present invention.
Figure 13:
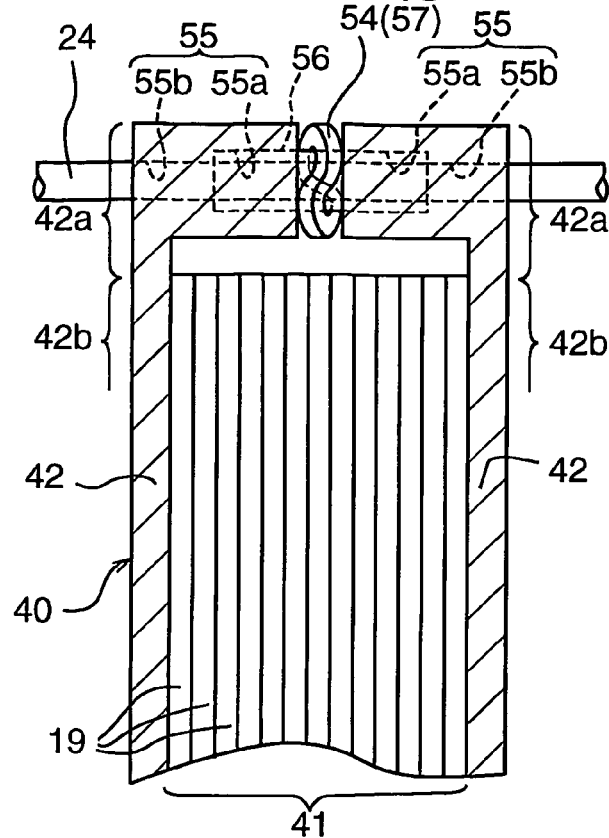
FIG. 13 is a cross-sectional view partially shown in side elevation, of a multi-cell module, including a deformation preventing member of a first example, of a fuel cell stack according to a seventh embodiment of the present invention.
Figure 14:
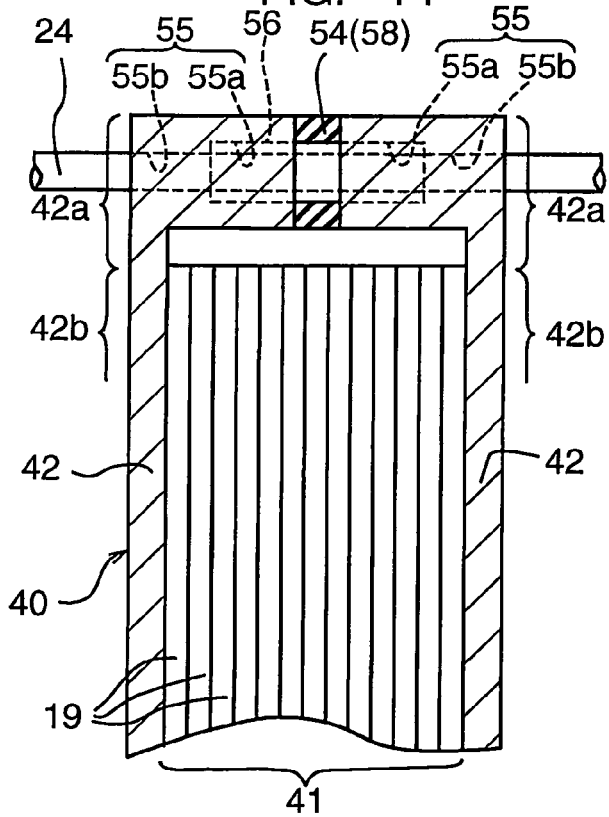
FIG. 14 is a cross-sectional view partially shown in side elevation, of a multi-cell module, including a deformation preventing member of a second example, of the fuel cell stack according to the seventh embodiment of the present invention.
Figure 15:
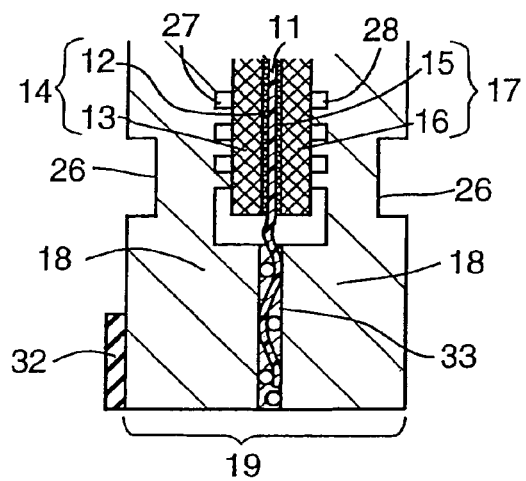
FIG. 15 is a cross-sectional view of a unit fuel cell of a multi-cell module of a fuel cell stack according to any embodiment of the present invention.
Figure 16:
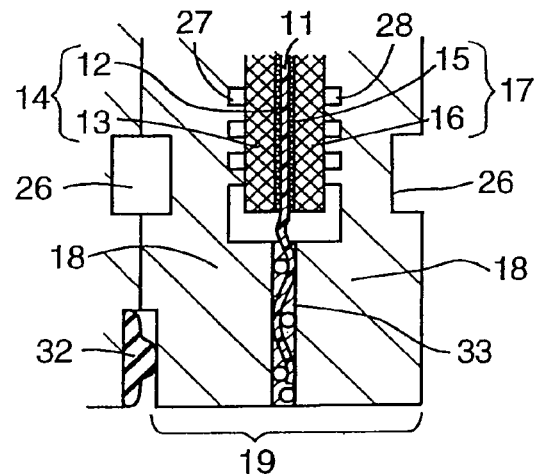
FIG. 16 is a cross-sectional view of a conventional fuel cell.
Figure 17:
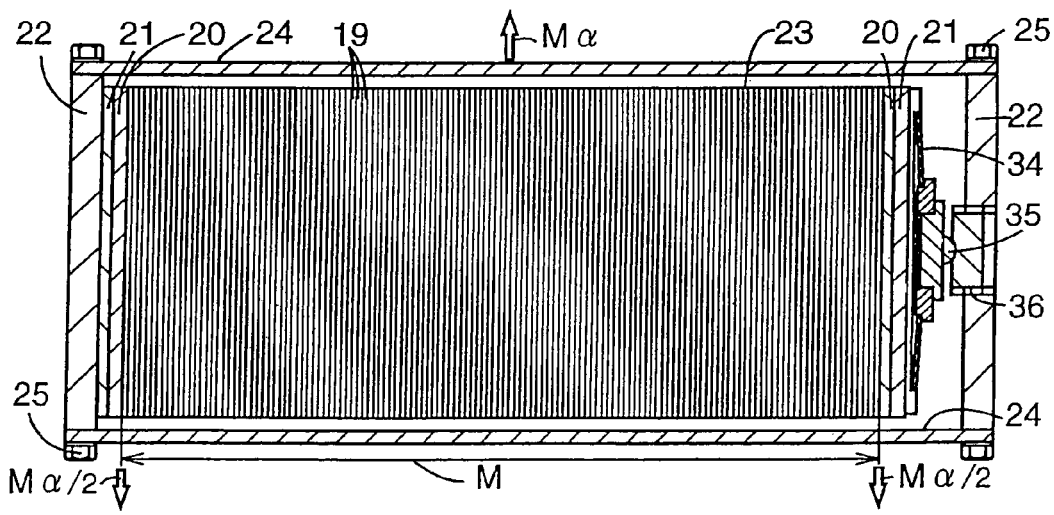
FIG. 17 is a cross-sectional view of a conventional fuel cell stack.

FIGS. 1-4 illustrate a first embodiment of the present invention; FIG. 5-7 illustrate a second embodiment of the present invention; FIGS. 8 and 9 illustrate a third embodiment of the present invention; FIG. 10 illustrates a fourth embodiment of the present invention; FIG. 11 illustrates a fifth embodiment of the present invention; FIG. 12 illustrates a sixth embodiment of the present invention; and FIGS. 13 and 14 illustrates a seventh embodiment of the present invention. FIG. 15 is applicable to any embodiment of the present invention.

Portions generic (common or similar) throughout all of the embodiments of the present invention are denoted with the same reference numerals throughout all of the embodiments of the present invention.

First, portions generic throughout all of the embodiments of the present invention will be explained with reference to FIGS. 1-4 and FIG. 15.

A fuel cell 10 assembled to a fuel cell stack according to the present invention is of a low temperature-type, and more particularly, of a PEFC-type. The fuel cell 10 is mounted to, for example, a vehicle. However, the fuel cell 10 may be used in an environment other than a vehicle.

The PEFC 10 includes a MEA and a separator 18 layered onto the MEA. The layering direction may be any direction including a vertical direction, a horizontal direction and an oblique direction.

As illustrated in FIG. 15, the MEA includes an electrolyte membrane 11 made from an ion exchange membrane and a pair of electrodes including an anode 14, such anode including a first catalyst layer 12 disposed on one side of the electrolyte membrane 11 and a cathode 17, such cathode including a second catalyst layer 15 disposed on the other side of the electrolyte membrane 11. A first diffusion layer 13 may be disposed between the first catalyst layer 12 and the separator 18, and a second diffusion layer 16 may be disposed between the second catalyst layer 16 and the separator 18.

The separator 18 may be any of a separator made from carbon (hereinafter, a carbon separator), a separator made from metal (hereinafter, a metal separator), a separator made from electrically conductive synthetic resin, a combination of a carbon separator and a synthetic resin frame, and a combination thereof.

A first separator 18 disposed on an anode side of the MEA has a fuel gas passage 27 formed therein at a first MEA opposing surface of the first separator for supplying fuel gas (hydrogen) to the anode 14 and a coolant (cooling water) passage 26 formed therein at a second opposite surface of the first separator. A second separator 18 disposed on the cathode side of the MEA has an oxidant gas passage 28 formed therein at a first MEA opposing surface of the second separator for supplying oxidant gas (oxygen, usually, air) to the cathode 17 and a coolant (cooling water) passage 26 formed therein at a second opposite surface of the second separator. The fuel gas passage 27 and the oxidant gas passage 28 construct a reactant gas passage.

Each of the first and second separators 18 has inlet and outlet fuel gas manifolds 30 in fluid communication with the fuel gas passage 27, inlet and outlet oxidant gas manifolds 31 in fluid communication with the oxidant gas passage 28, and inlet and outlet coolant manifolds 29 in fluid communication with the coolant passage 26.

A fuel gas supply pipe and a fuel gas exhaust pipe are fluidly connected to the inlet and outlet fuel gas manifolds 30, respectively, and fuel gas flows from the fuel gas supply pipe via the inlet fuel gas manifold 30 to the fuel gas passage 27, and from the fuel gas passage 27 via the outlet fuel gas manifold 30 to the fuel gas exhaust pipe. An oxidant gas supply pipe and an oxidant gas exhaust pipe are fluidly connected to the inlet and outlet oxidant gas manifolds 31, respectively, and oxidant gas flows from the oxidant gas supply pipe via the inlet oxidant gas manifold 31 to the oxidant gas passage 28, and from the oxidant gas passage 28 via the outlet oxidant gas manifold 31 to the oxidant gas exhaust pipe. A coolant supply pipe and a coolant exhaust pipe are fluidly connected to the inlet and outlet coolant manifolds 29, respectively, and coolant flows from the coolant supply pipe via the inlet coolant manifold 29 to the coolant passage 26, and from the coolant passage 26 via the outlet coolant manifold 29 to the coolant exhaust pipe.

The fuel gas supply pipe, the fuel gas exhaust pipe, the oxidant gas supply pipe, the oxidant gas exhaust pipe, the coolant supply pipe and the coolant exhaust pipe are located on one side of the fuel cell stack in the fuel cell stacking direction.

The fluid passages 26, 27, 28, 29, 30, 31 are sealed by seals 32 and 33 so that fuel gas, oxidant gas and coolant are not mixed with each other and do not leak into the environment. The seal 32 is a rubber seal (rubber gasket) and the seal 33 is an adhesive seal (adhesive).

The MEA and the first and second separators disposed on opposite sides of the MEA construct a unit fuel cell 19 (hereinafter, fuel cell). A plurality of fuel cells (preferably, five to thirty fuel cells, and more preferably, ten to thirty fuel cells) are layered and usually adhered onto each other by the adhesive 33. This plurality of fuel cells construct the multi-cell assembly 41. The multi-cell assembly 41 and opposite end fuel cells 42 disposed on opposite ends of the multi-cell assembly 41 construct a multi-cell module 40. FIGS. 3 and 4 illustrate the multi-cell module 40. In a case where the individual fuel cells of the multi-cell assembly 41 are adhered to each other by the adhesive 33, the multi-cell assembly 41 is integral and cannot be disassembled into individual fuel cells.

In a case where the individual fuel cells of the multi-cell assembly 41 are sealed by the rubber gasket 32, the multi-cell assembly 41 can be disassembled into individual fuel cells.

Figure 1:
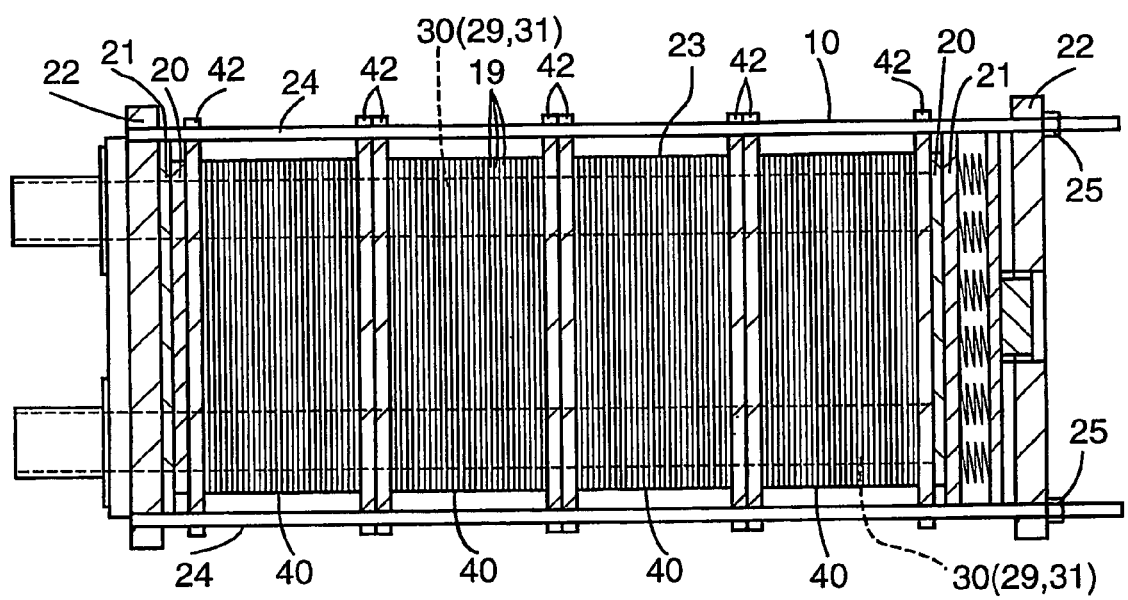
FIG. 1 is a cross-sectional view of a fuel cell stack according to a first embodiment of the present invention.
Figure 2:
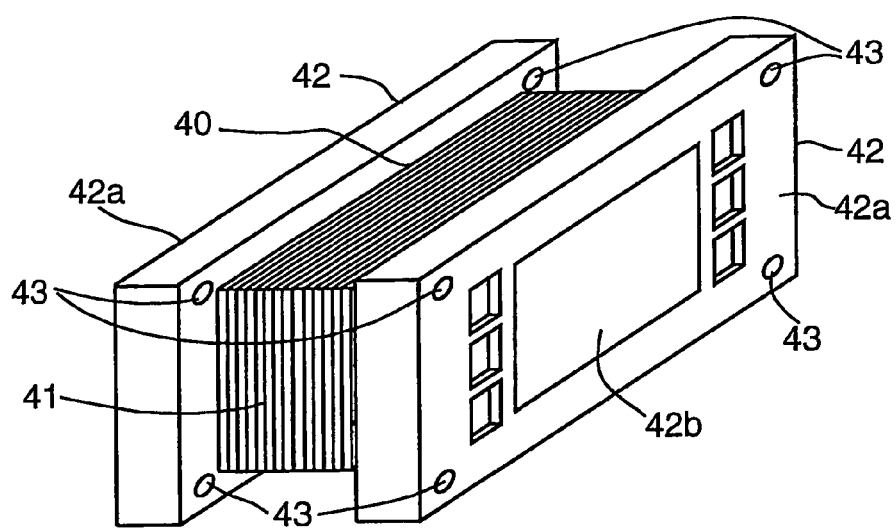
FIG. 2 is a perspective view of a multi-cell module of the fuel cell stack according to the first embodiment of the present invention.

As illustrated in FIG. 1, the multi-cell modules 40 are stacked in a series in the fuel cell stacking direction (module stacking direction) to form a plurality of multi-cell modules, terminals 20, electrical insulators 21, and end plates 22, all of which are disposed on opposite ends of the plurality of multi-cell modules in the fuel cell stacking direction to construct a fuel cell stack 23. After tightening the fuel cell stack 23 in the fuel cell stacking direction, the fuel cell stack 23 is fastened by coupling a bolt or a nut 25 to a fastening member 24 which extends in the fuel cell stacking direction over all of the multi-cell modules 40.

The fastening member 24 may include, for example, a plurality of fastening shafts. The fastening member includes at least four fastening shafts, preferably at least six fastening shafts, and more preferably at least ten fastening shafts. Since the fastening member 24 corresponds to the tension plate 24 of FIG. 14, the fastening member is denoted with the same reference numeral, "24".

Adjacent multi-cell modules 40 may be connected to each other by a connecting member 50 at the end fuel cells 42 of the adjacent multi-cell modules 40.

As a result of the above-described structures, the fuel cell stack 23 of the present invention includes the plurality of multi-cell modules 40 stacked in series. Each multi-cell module 40 includes the multi-cell assembly 41 including a plurality of fuel cells layered and the opposite end fuel cells 42. Each multi-cell module 40 is restrained at the opposite end fuel cells 42 by a restraining member which may be the fastening member 24. Each multi-cell module 40 is restrained in the direction perpendicular to the fuel cell stacking direction.

Preferably, in a case of an integral multi-cell module 40, an integral multi-cell assembly 41 including fuel cells adhered to each other by the adhesive seal 33 is disposed between the opposite end fuel cells 42, and each opposite end fuel cell 42 is adhered to the integral multi-cell assembly 41 by the adhesive seal 33. However, the multi-cell module 40 is not limited to an integral multi-cell module.

The opposite end fuel cells 42 may be a dummy fuel cell generating no electric power. However, the opposite end fuel cell 42 is not limited to a dummy fuel cell but may be a fuel cell generating electric power. In the case of the dummy fuel cell, the end fuel cell 42 is designed to be a structural member capable of enduring a transverse inertial force of the multi-cell module.

The end fuel cell 42 of the multi-cell module 40 is extended outwardly in the fuel cell stacking direction to construct an extended portion 42a. The extended portion 42a is a flange portion. The multi-cell module 40 is restrained in the direction perpendicular to the fuel cell stacking direction at the extended portion 42a by the restraining member.

The end fuel cell 42 may include an electrically conductive separator portion 42b having substantially the same configuration as that of the fuel cell of the multi-cell assembly 41 and the extended portion 42a formed in the form of a frame having an opening 42c at a central portion of the end fuel cell. The separator portion 42b has a protrusion 42d fitted into the opening 42c of the extended portion 42a. The height of the protrusion 42d is equal to a thickness of a wall of the extended portion surrounding the opening 42c. Due to this structure, the protrusion 42d contacts a separator portion of an end fuel cell of an adjacent multi-cell module. The fuel gas manifold 30, the oxidant gas manifold 31 and the coolant manifold 29 are formed in the extended portion 42a, which is in the shape of a frame, and the separator portion 42b.

The extended portion 42a and the separator portion 42b may be integrally formed with each other. As another case, as illustrated in FIGS. 3 and 4, the extended portion 42a and the separator portion 42b may be separately formed with each other and the separator portion 42b is fitted into the extended portion 42a to be adhered to the extended portion 42a.

In the case where the extended portion 42a and the separator portion 42b are integrally formed with each other, the extended portion 42a should be electrically conductive. In the case where the extended portion 42a and the separator portion 42b are separately formed, the extended portion 42a may be electrically conductive or may be made from electrically non-conductive material such as a synthetic resin.

Further, as illustrated in FIGS. 3 and 4, the extended portion 42a may have a greater thickness than the separator portion 42b so as to be more rigid, or it may have the same thickness as the separator portion 42b.

In the extended portion 42a of the end fuel cell 42 of the multi-cell module 40, holes 43 penetrating the extended portion 42a in the fuel cell stacking direction are formed. The holes 43 are provided at four corners of the extended portion 42a having a rectangular configuration. The number of the holes 43 is equal to or more than four, preferably equal to or more than six, and more preferably, equal to or more than eight, and most preferably, for example, ten. In the case where the number of the holes 43 is ten, for example, five holes are provided along an upper side of the rectangular extended portion and remaining five holes are provided along a lower side of the extended portion.

The restraining member 24 which may be constructed of a restraining shaft extends through the hole 43 of the extended portion 42a of the end fuel cell 42 and restrains the multi-cell module 40 in the direction perpendicular to the fuel cell stacking direction.

The restraining shaft 24 may be the fastening shaft 24 of the fuel cell stack 23. In the embodiment of FIG. 1, the restraining shaft 24 and the fastening shaft are a common shaft serving a dual purpose. The fastening shaft 24 of the fuel cell stack 23 extends between the opposite end plates 22. Using the fastening shaft 24, without providing any other shaft, each multi-cell module 40 is restrained in the direction perpendicular to the fuel cell stacking direction. The restraining shaft 24 may slide in the hole 43.

Next, effects and technical advantages of the portions common or similar over all of the embodiments of the present invention will be explained.

Since the fuel cell stack 23 is divided into a plurality of multi-cell modules 40 and each multi-cell module 40 is restrained in the direction perpendicular to the fuel cell stacking direction at the opposite end fuel cells 42 of each multi-cell module 40, a transverse inertial force of each multi-cell module 40 and a shear force imposed on each multi-cell module 40 is 1/n of those of the conventional fuel cell stack, where n is a number of divisions of the stack 23 into the plurality of multi-cell modules 40. More particularly, in the conventional stack, a transverse force of $(M\alpha)$ acts on the entire portion of the stack, where M is a mass of the stack and $\alpha$ is an acceleration of an impact force in the direction perpendicular to the fuel cell stacking direction, and therefore, a shear force S of $(M\alpha)/2$ acts on the end fuel cell of the stack. In contrast, in the present invention, a transverse force acting on each multi-cell module 40 is $(M\alpha)/n$ and the shear force of each multi-cell module 40 is S/n. As a result, each multi-cell module 40 can endure a high G force (acceleration of gravity).

Further, a spring force imposed on the multi-cell module 40 in the fuel cell stacking direction does not need to be as large as the force required in the conventional fuel cell stack that generates a frictional force capable of enduring the shear force of $(M\alpha)/2$. The spring force imposed on the multi-cell module 40 in the fuel cell stacking direction can be reduced to a force which is necessary to keep an electric contact resistance in the stack 23 small. As a result, the creep amount of the stack 23 in the fuel cell stacking direction is also reduced.

Further, since the fuel cell stack 23 is divided into a plurality of multi-cell modules 40, a displacement of the fuel cell stack 23 in the fuel cell stacking direction due to the creep of the MEA and the diffusion layers 13, 16 does not concentrate to the end fuel cell 42 of the stack 23, unlike the conventional fuel cell stack. The displacement of a fuel cell is distributed to all of the multi-cell modules 40. As a result, a displacement in the fuel cell stacking direction of each multi-cell module 40 is reduced to a great extent compared with the displacement of the end fuel cell in a conventional stack. In addition, since the creep amount itself is small due to a decrease in the spring force, the displacement of a fuel cell of each multi-cell module 40 is small.

Further, since a structure where multi-cell modules 40 are restrained at an entire side surface thereof by an external restraining member is not adopted, (more particularly, since the structure as shown in FIG. 14, i.e., a sponge rubber is inserted into a space between the tension plate and the fuel cells layered to restrain from outside the fuel cells layered, is not adopted,) the fuel cell of the multi-cell module 40 will not interfere with the external restraining member causing it to be damaged, even if the fuel cell of the multi-cell module 40 moves in the fuel cell stacking direction due to a thermal expansion.

Further, since the structure where the multi-cell modules are restrained at the entire side surface by an external restraining member is not adopted, the external restraining member and a module frame (which surrounds the layered fuel cells and is restrained by the external restraining member) do not need to be provided, and a space for providing the external restraining member and the module frame is unnecessary. As a result, the fuel cell stack 23 can be compact (by reducing the thickness of the restraining member and removing the module frame) and light. Due to the lightened stack, a counter-measure for an impact force with a high G force is easily provided. Further, due to the removal of the module frame, coupling a fuel cell voltage monitor to the fuel cell is easily provided. If the module frame were provided, a hole would have to be formed in the module frame, and the cell monitor would have to be extended through the hole and then be fixed to the fuel cell, which would make the structure and work complex.

In the case where the end fuel cell 42 is a dummy fuel cell, the end fuel cell 42 can be designed as a structural member for receiving a force independent of a power generating feature, so the end fuel cell 42 can endure a transverse impact with sufficient strength and reliability.

Since the end fuel cell of the multi-cell module 40 is extended outwardly and the multi-cell module 40 is restrained in the direction perpendicular to the fuel cell stacking direction at the extended portion 42a, it is not necessary to make a significant design change to the fuel cell structure of the multi-cell module 40.

Further, since the extended portion 42a has a hole 43 and the restraining shaft 24 extends through the hole 43, the end fuel cells 42 and the restraining shafts 24 form a frame in the shape of a ladder, so that the multi-cell module can be supported in the direction perpendicular to the fuel cell stacking direction with a sufficient strength and reliability.

Further, since the fastening shaft 24 is used as the restraining shaft 24, a shaft different from the fastening shaft does not need to be provided for the restraining shaft, which simplifies a structure of the fuel cell stack 23 and reduces the number of parts of the fuel cell stack 23.

Next, portions unique to each embodiment of the present invention will be explained.

Embodiment 1

In embodiment 1 of the present invention, as illustrated in FIGS. 1-4, the extended portion 42a of the end fuel cell 42 is made from synthetic resin and the separator portion 42b of the end fuel cell 42 is made from metal, for example, stainless steel. The holes 43 are provided at the four corners of the rectangular extended portion 42a.

The individual fuel cells of the multi-cell assembly 41 of the multi-cell module 40 is adhered to each other by the adhesive seal 33. The seal between the adjacent multi-cell modules 40 (between a multi-cell module and its multi-cell module) is a rubber gasket 32.

The fastening shaft 24 which is commonly used as the restraining shaft 24 extends through the hole 43 formed in the extended portion 42a and restrains the multi-cell module 40 in the direction perpendicular to the fuel cell stacking direction. Since the extended portion 42a of the end fuel cell 42 is made from synthetic resin, the extended portion 42a is electrically insulated from the fastening shaft 24, and therefore, a particular electrically insulating structure is not necessary.

Other structures are the same as those described in the portions common to all of the embodiments of the present invention.

With respect to effects and technical advantages of embodiment 1 of the present invention, in a vehicle where the fuel cell stack is mounted with a fuel cell stacking direction directed in a right and left direction of the vehicle, an external force at a collision of the vehicle enters the multi-cell module 40 at the end fuel cell 42 and not at inboard fuel cells. On the inboard fuel cells of the multi-cell module 40, an inertial force only acts. By suppressing the number of the fuel cells of the multi-cell module 40 to twenty or so (within five to thirty), the inertial force is suppressed, so that the fuel cells can be supported by the fixing force only by the adhesive seal 33. A frictional force prevents slippage between end fuel cells of adjacent multi-cell modules 40. When the inertial force is greater than the frictional force, the inertial force is supported by both the frictional force and the fastening shaft 24.

Other effects and technical advantages are the same as described in the portions common to all of the embodiments of the present invention.

Embodiment 2

In embodiment 2 of the present invention, as illustrated in FIGS. 5-7, the end fuel cells 42 of adjacent multi-cell modules 40 are connected by a connecting member 50 that is different from the fastening shaft 24. In Embodiment 2 of the present invention, the connecting member 50 is a clip 50A. The clip 50A may have or may not have elasticity.

With respect to effects and technical advantages of embodiment 2 of the present invention, the rubber gasket 32 seals between the adjacent multi-cell modules 40 and adhesive seal 33 seals between the fuel cells in each multi-cell module. When the spring force of the spring located at an end of the stack acts on the multi-cell modules 40, and if the opposing end fuel cells 42 of the adjacent multi-cell modules 40 do not have a sufficient rigidity, the opposing end fuel cells 42 will be deformed in a direction away from each other. As a result, a necessary seal force is not imposed on the rubber gasket 32.

However, in embodiment 2 of the present invention, since the opposing end fuel cells 42 of the adjacent multi-cell modules 40 are clipped by the clip 50A at outer ends of the extended portions 42a, a sufficient seal force can be given to the rubber gasket 32 to compensate the insufficient rigidity of the end fuel cells 42. As a result, the end fuel cells 42 may be decreased in thicknesses and may be lightened.

Embodiment 3

In embodiment 3 of the present invention, as illustrated in FIGS. 8 and 9, the end fuel cells 42 of adjacent multi-cell modules 40 are connected by the connecting member 50 which is different from the fastening shaft 24. In embodiment 3 of the present invention, the connecting member 50 is a bolt 50B or a rivet.

The effects and technical advantages of embodiment 3 of the present invention are discussed below. In the case where the seal between the fuel cells of each multi-cell module 40 is an adhesive seal and the seal between the adjacent multi-cell modules 40 is a rubber gasket 32, if the end fuel cells 42 of the adjacent multi-cell modules do not have a sufficient rigidity, a sufficient seal force cannot be given to the rubber gasket 32.

However, in embodiment 3 of the present invention, since the opposing end fuel cells 42 of the adjacent multi-cell modules 40 are pressed against each other by the bolt 50B or a rivet at the extended portions 42a, a sufficient seal force can be given to the rubber gasket 32 to compensate the insufficient rigidity of the end fuel cells 42. As a result, the end fuel cells 42 may be decreased in thickness and may be lightened.

Embodiment 4

In embodiment 4 of the present invention, as illustrated in FIG. 10, the end fuel cells 42 of adjacent multi-cell modules 40 are connected by the connecting member 50 which is different from the fastening shaft 24. Both the fastening shaft 24 and the connecting member 50 may be used, or the connecting member 50 alone may be used. In embodiment 4 of the present invention, the connecting member 50 is an ear portion 50C formed in the extended portion 42a of the end fuel cell 42 of the multi-cell module 40, and the ear portion 50C is bent and caulked so as to hold the extended portion 42a of the contacting end fuel cell 42 of an adjacent multi-cell module 40. The caulked portion may be spot-welded so as to further strengthen the ear portion 50C.

Embodiment 4 of the present invention is advantageous in the case where the seal between the fuel cells of each multi-cell module 40 is an adhesive seal and the seal between the adjacent multi-cell modules 40 is a rubber gasket 32. It is likely that in such a situation the end fuel cells 42 of the adjacent multi-cell modules will not have sufficient rigidity, and therefore, a sufficient seal force cannot be given to the rubber gasket 32.

However, in embodiment 4 of the present invention, since the opposing end fuel cells 42 of the adjacent multi-cell modules 40 are fixed to each other by the caulking or by the caulking and welding, a sufficient seal force can be given to the rubber gasket 32 to compensate the insufficient rigidity of the end fuel cells 42. As a result, the end fuel cells 42 may be decreased in thickness and be lightened.

Embodiment 5

In embodiment 5 of the present invention, as illustrated in FIG. 11, the end fuel cells 42 of adjacent multi-cell modules 40 are constructed of an electrically conductive material plate such as a carbon plate or a metal plate. The restraining shaft 24 extends through the holes 43 formed in the end fuel cells 42. The end fuel cells 42 and the restraining shaft 24 are electrically insulated from each other by an electrical insulator 51.

The electrical insulator 51 is constructed of a bushing 51A made from synthetic resin. The bushing 51A may be a grommet. A thickness "a" of the bushing 51A may be determined according to an electrical voltage environment.

The bushing 51A has a flange portion 52 extending radially outward at the end of the bushing 51A. In the end fuel cell 42, a stepped recess 53 is formed around the hole 43 for receiving the flange portion 52 therein. The bushing 51A is coupled to the end fuel cell 42 such that the flange portion 52 is fitted into the stepped recess 53, and the opposing end fuel cells 42 of the adjacent multi-cell modules 40 are connected by the connecting member with the flange portions 52 opposed to each other.

With respect to effects and technical advantages of embodiment 5 of the present invention, since the bushing 51A is provided, a short circuit between the shaft 24 and the fuel cell is prevented. Due to the prevention of a short circuit, the extended portion 42a is allowed to be formed by extending outwardly the carbon or metal separator of the end fuel cell. As a result, the structure can be simplified, compared with a case where the extended portion 42a is made from synthetic resin separately from the separator portion 42b.

Embodiment 6

In embodiment 6 of the present invention, as illustrated in FIG. 12, the end fuel cells 42 of adjacent multi-cell modules 40 are constructed of an electrically conductive material plate such as a carbon plate or a metal plate. The restraining shaft 24 extends through the holes 43 formed in the end fuel cells 42. The end fuel cells 42 and the restraining shaft 24 are electrically insulated from each other by an electrical insulator 51.

The electrical insulator 51 is constructed of a pipe 51B made from synthetic resin covered on the fastening shaft 24. The "pipe" by be replaced by an insulating coating coated to the fastening shaft 24. A thickness "a" of the pipe 51B is determined according to an electrical voltage environment.

With respect to effects and technical advantages of embodiment 6 of the present invention, since the synthetic resin pipe 51B is provided, a short circuit between the shaft 24 and the fuel cell is prevented. Due to the prevention of a short circuit, the extended portion 42a is allowed to be formed by extending outwardly the carbon or metal separator of the end fuel cell. As a result, the structure can be simplified, compared with a case where the extended portion 42a is made from synthetic resin separately from the separator portion 42b.

Embodiment 7

As illustrated in FIG. 13 (which illustrates a first example of embodiment 7 of the present invention) and FIG. 14 (which illustrates a second example of embodiment 7 of the present invention), in embodiment 7 of the present invention, the extended portion 42a is formed in the end fuel cell 42 by extending the end fuel cell 42 outwardly in the direction perpendicular to the fuel cell stacking direction. Between the extended portions 42a of opposite end fuel cells 42 of each multi-cell module 40, a deformation preventing member 54 is provided for preventing the opposite end fuel cells 42 from being deformed inboardly in the fuel cell stacking direction.

The deformation preventing member 54 may include an elastic or resilient member capable of being elastically deformed.

In the first example of embodiment 7, as illustrated in FIG. 13, the extended portions 42a of the opposite end fuel cells 42 of each multi-cell module 40 protrude inboardly in the fuel cell stacking direction. In each extended portion 42a, a stepped penetration hole 55 is formed. The stepped hole 55 includes a first hole portion 55a having a first diameter and a second hole portion 55b having a second diameter smaller than the first diameter. In each of the extended portions 42a of the opposite end fuel cells 42, the first hole portions 55a are located more inboard in the fuel cell stacking direction than the second hole portions 55b. An electrically non-conductive cylindrical collar 56 and an electrically non-conductive annular wave washer 57 that is waved so as to be convex and concave in a direction perpendicular to an annular direction of the wave washer are located between the opposite end fuel cells 42. The wave washer 57 defines the deformation preventing member 54. The collar 56 penetrates the wave washer 57. One end portion of the collar 56 is inserted into the first hole 55a of the stepped hole 55 formed in the extended portion 42a of one of the opposite end fuel cells 42 of the multi-cell module 40, and the other end portion of the collar 56 is inserted into the first hole 55a of the stepped hole 55 formed in the extended portion 42a of the other of the opposite end fuel cells 42 of the multi-cell module 40. The wave washer 57 is located between the opposing surfaces of the extended portions 42a of the opposite end fuel cells 42 of the multi-cell module 40, and is not inserted into the stepped holes 55. The restraining shaft 24 extends through the collar 56.

In the second example of embodiment 7, as illustrated in FIG. 14, the wave washer 57 of the first example of embodiment 7 is replaced by a collar 58 made from a rubber-based material. In the second example of embodiment 7, the collar 58 defines the deformation preventing member 54 made from elastic material. Other structures including a stepped penetrating hole 55 having a first, large-diameter hole 55a and a second, smaller diameter hole 55b, a collar 56, and a restraining shaft 24 of the second example of embodiment 7 are the same as those of the first example of embodiment 7, as illustrated in FIG. 13.

Effects and technical advantages of embodiment 7 of the present invention are as follows:

The extended portion 42a of the end fuel cell 42 extends outwardly from the multi-cell assembly 41 in the direction perpendicular to the fuel cell stacking direction and defines a cantilever structure with respect to the multi-cell assembly 41. Accordingly, the extended portion 42a is likely to be deformed inboardly in the fuel cell stacking direction and is structurally unstable. If the extended portion 42a is deformed inboardly in the fuel cell stacking direction, a corner of the extended portion at an end of the hole 55 will contact the restraining shaft 24 to generate a friction when sliding. Further, if the extended portion 42a is deformed inboardly in the fuel cell stacking direction, a necessary seal force will not act on the rubber gasket 32 between adjacent multi-cell modules 40.

However, in the first and second examples of the embodiment 7 of the present invention, since the deformation preventing member 54 is provided between the extended portions 42a of the opposite end fuel cells 42 of the multi-cell module 40, the extended portion 42a of the end fuel cell 42 is effectively prevented from being deformed inboardly in the fuel cell stacking direction, and the multi-cell module 40 can smoothly move relative to the restraining member.

Further, since the deformation preventing member 54 includes an elastic or resilient member, the deformation preventing member 54 supports the extended portions 42a of the end fuel cell 42 up to a certain load and allows a load exceeding the certain load to escape, whereby deformation of the end fuel cell 42a is prevented without causing a structural trouble.

The invention claimed is:

1. A fuel cell stack comprising:
   a plurality of multi-cell modules stacked in series, each of the plurality of multi-cell modules comprising a plurality of fuel cells layered in a fuel cell stacking direction and including opposite end fuel cells, each of which is a dummy fuel cell generating no electrical power, at opposite ends of the plurality of fuel cells layered; and
   a restraining member, which extends in the fuel cell stacking direction over all of the plurality of multi-cell modules, for restraining each of the plurality of multi-cell modules in a direction perpendicular to the fuel cell stacking direction at the opposite end fuel cells of each of the plurality of multi-cell modules, wherein:
   each of the opposite end fuel cells of each of the plurality of multi-cell modules has an extended portion formed by extending each of the opposite end fuel cells of each of the plurality of multi-cell modules outwardly in a direction perpendicular to the fuel cell stacking direction of each of the plurality of multi-cell modules,
   each of the dummy fuel cells has an electrically conductive separator portion having substantially the same configuration as the plurality of cells and a protrusion fitted into an opening of the extended portion, and
   each of the plurality of multi-cell modules is restrained by the restraining member in the direction perpendicular to a fuel cell stacking direction of each of the plurality of multi-cell modules at the extended portion.

2. A fuel cell stack according to claim 1, further comprising:
   a connecting member for connecting adjacent multi-cell modules of the plurality of multi-cell modules to each other at opposing end fuel cells of the adjacent multi-cell modules.

3. A fuel cell stack according to claim 1, wherein the extended portion includes a hole formed therein and the restraining member is a restraining shaft extending through the hole formed in the extended portion.

4. A fuel cell stack according to claim 3, wherein the restraining shaft is a fuel cell stack tightening shaft.

5. A fuel cell stack according to claim 2, wherein the connecting member is a member different from the restraining member.

6. A fuel cell stack according to claim 5, wherein the connecting member is a clip.

7. A fuel cell stack according to claim 5, wherein the connecting member is a member selected from the group composed of a bolt and a rivet.

8. A fuel cell stack according to claim 5, wherein the connecting member is an ear portion formed in an extended portion of an end fuel cell of a first multi-cell module, the ear portion being bent so as to hold an extended portion of an end fuel cell of a second, adjacent multi-cell module.

9. A fuel cell stack according to claim 3, wherein the extended portion and the restraining shaft are electrically insulated from each other by an electric insulator.

10. A fuel cell stack according to claim 9, wherein the electric insulator is a bushing fixed to the hole formed in the extended portion of each of the opposite end fuel cells.

11. A fuel cell stack according to claim 10, wherein the bushing has a flange for preventing the bushing from being disengaged from the extended portion.

12. A fuel cell stack according to claim 9, wherein the electric insulator is a cylindrical member supported by the restraining shaft.

13. A fuel cell stack according to claim 1, further comprising:
    a deformation preventing member, disposed between extended portions of the opposite end fuel cells of each of the plurality of multi-cell modules, for preventing the extended portions of the opposite end fuel cells of each of the plurality of multi-cell modules from being deformed inboardly in the fuel cell stacking direction.

14. A fuel cell stack according to claim 13, wherein the deformation preventing member includes an elastic or resilient member.

* * * * *